Figure 1:
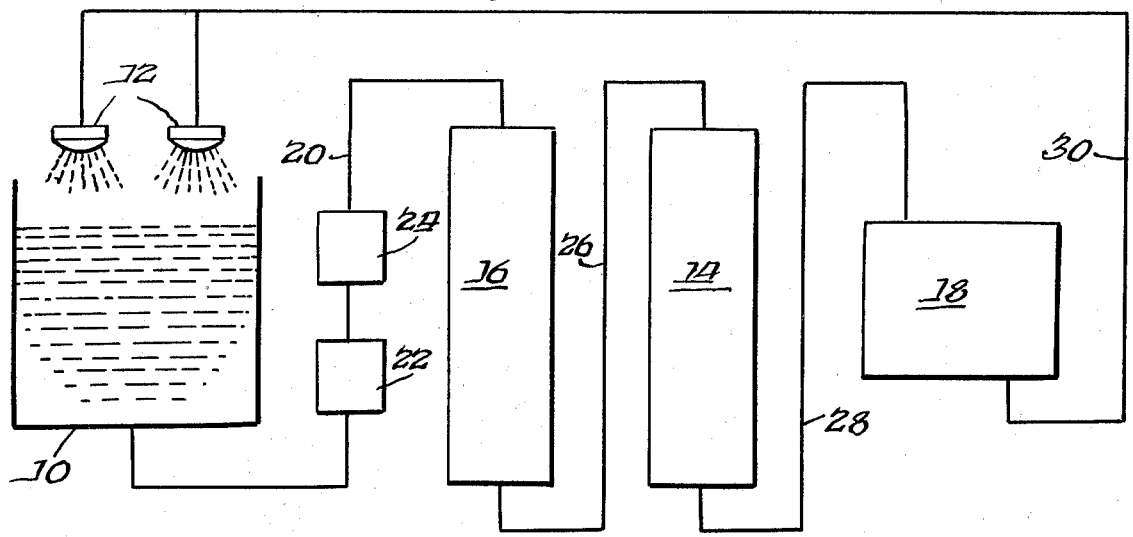

United States Patent [19]
Wachsmuth

[11] 3,989,624
[45] Nov. 2, 1976

[54] METHOD AND APPARATUS

[75] Inventor: William A. Wachsmuth, Mississauga, Canada

[73] Assignee: Ecodyne Limited, Oakville, Canada

[22] Filed: Dec. 20, 1972

[21] Appl. No.: 316,722

[52] U.S. Cl. .............................. 210/34; 210/37 B; 210/175; 210/269
[51] Int. Cl.² ..................... C02B 1/42; C02B 1/56
[58] Field of Search .................. 210/30, 32, 34, 35, 210/37, 38, 175, 266, 269

[56] References Cited
UNITED STATES PATENTS

| | | | |
|---|---|---|---|
| 3,531,401 | 9/1970 | Crits | 210/34 |
| 3,658,470 | 4/1972 | Zievers et al. | 210/37 |
| 3,664,950 | 5/1972 | Saraceno et al. | 210/35 |
| 3,681,210 | 8/1972 | Zievers et al. | 210/38 |
| 3,761,381 | 9/1973 | Yagishita | 210/38 |

OTHER PUBLICATIONS
Arden et al., Journal of Applied Chemistry, vol. 11, July, 1961, pp. 229–234.
Dorfner, Ion Exchangers; Properties and Applications, 1972, pp. 177–180.

*Primary Examiner*—Charles N. Hart
*Assistant Examiner*—Ivars Cintins
*Attorney, Agent, or Firm*—Hume, Clement, Brinks, Willian, Olds & Cook, Ltd.

[57] ABSTRACT

The invention provides a method and apparatus for rinsing an object which has been removed from a chromium plating bath, and which has a source of chromium-containing anions thereon, while preventing the delivery of these anions to the environment. In carrying out the invention, chromium-containing anions are removed from the rinse water by an anion-exchange resin. The resin is periodically regenerated by backwashing it, delivering a dilute alkali metal hydroxide solution to the resin, delivering a more concentrated solution of alkali metal hydroxide to the resin, and by rinsing the resin. Effluent from the backwashing and the initial portion of the regeneration procedure is retained and later delivered to the resin. Effluent which contains a higher concentration of chromate ions, displaced from the resin, is delivered to a concentrated chromate solution storage tank. As the regeneration progresses, the effluent becomes richer in hydroxide ions, and this effluent is delivered first to the dilute and then to the concentrated anion regenerant tank for re-use. Finally, the resin is rinsed, and the final effluent is delivered to the dilute chromate solution tank. Water which has passed through the resin is used for regenerant solution makeup and for rinsing and backwashing, as well as for rinsing plated articles.

11 Claims, 2 Drawing Figures

METHOD AND APPARATUS

The present invention relates to a method and apparatus for treating a liquid containing chrominum-containing anions, while preventing the delivery of those anions to the environment.

Chromate ions are produced by many industrial processes, particularly chrome plating and chrome dipping processes. In chrome plating processes, chromium ions are electroplated onto an object, while chrome dipping simply involves the dipping of an object into a solution of chromate ions without any external electrical potential being applied.

Because of the widespread use of chromium plating and dipping as a method for improving the appearance and/or corrosion resistance of metal objects, the delivery of chromium-containing anions, often along with other ions produced in the plating operation, to the environment has become a serious problem. This problem arises primarily from the rinsing step employed in the plating procedure, wherein the plated article is rinsed after being removed from the plating bath. Heretofore, the contaminated rinse water was often delivered directly to the environment. Although the concentration of chromium-containing anions in the rinse water might be low, even in low concentrations such ions can have serious adverse environmental effects.

In addition, more concentrated chromate solution is produced when it becomes necessary to dump the plating bath itself.

By the term chromium-containing anions, applicant refers primarily to the chromate ($CrO_4$), and dichromate ($Cr_2O_7$) ions. However, it is entirely possible that other chromium-containing anions may be present in the rinse water obtained in a plating plant. Such anions might include, for example, perchromate ($CrO_8$) or anion complexes containing chromium ions, possibly in combination with other organic or inorganic materials. It should be understood that, as used herein, the term chromate refers to any of these chromium-containing anions which may be present in the rinse-water bath from a plating plant. Thus, the terms chromate and chromium-containing anion are considered to be synonymous.

Generally, the present invention provides a method and apparatus handling chromium-containing anions, particularly anions from the rinse bath which is used to rinse plated objects. The source of anions in the rinse bath will ordinarily be a simple residual solution of chromate ions that have been carried over from the plating bath. However, if any significant drying has taken place, it is also possible that this source of chromate ions will be present in solid form on the plated object. In any event, this source of chromate ions must be rinsed from the plated object, and, in accordance with the present invention, the delivery of these anions to the environment is prevented. Furthermore, in accordance with the invention, purified rinse water from the plating operation, which has passed through ion-exchange resin, is used not only for the rinsing of plated objects, but also for the backwashing and rinsing of the ion-exchange resins and for the makeup of ion-exchange resin regenerant solutions.

In carrying out the present invention, rinse water is first passed over an object which has a source of chromium-containing anions thereon, such as an object that has just been removed from a chromium plating bath. The solution of chromium-containing anions, which will ordinarily be collected in a rinse tank or basin, is delivered to an anion-exchange resin, where the chromium-containing anions are removed, and exchanged for hydroxide ions, so that purified water is formed. This purified water is delivered from the anion-exchange resin to a reservoir. Water from the reservoir may then again be passed over an object having a source of chromium-containing anions thereon to repeat the rinsing operation.

It is, of course, essential to also prevent the delivery of chromium-containing anions to the environment during the regeneration of the anion-exchange resin. Thus, the resin is periodically regenerated in the following sequence. First, the resin is backwashed for a predetermined time period with water from the aforementioned reservoir. A dilute solution of alkali metal hydroxide from a dilute anion regenerant tank is then delivered to the resin tank to begin the regeneration process. A more concentrated solution of alkali metal hydroxide from a concentrated anion regenerant tank is then delivered to the resin, and the resin is finally rinsed with water from the reservoir. After this final rinse, the anion-exchange resin column can be returned to service.

The effluent from the anion-exchange resin column during the backwashing procedure will initially consist of a dilute solution of chromate ions, which is simply being rinsed from the resin. Similarly, during the initial portion of the regenerant delivery, backwash water will be displaced, and the effluent will be a dilute solution of chromate ions. This dilute chromate solution is delivered to a dilute chromate solution tank.

As the regeneration progresses, chromate-containing anions are displaced from the anion-exchange resin by the alkali metal hydroxide regenerant, and a more concentrated chromate solution is formed. This more concentrated chromate solution is delivered to a concentrated chromate solution tank, where it is retained for chromate recovery. As the regeneration progresses further, the effluent from the anion-exchange resin column will become less concentrated in chromate and more concentrated in hydroxide ions. This solution, containing hydroxide ions, is delivered to the aforementioned dilute anion regenerant tank for use in the next regeneration procedure.

As the regeneration continues further, the effluent from the regeneration column will become even more concentrated in hydroxide ions, and this more concentrated solution is delivered to the concentrated anion regenerant tank. Finally, as the resin is given its final rinse, the hydroxide ion concentration in the effluent will decrease, and the effluent will again be substantially water, perhaps containing a very dilute solution of chromate and/or hydroxide ions from the final stages of the regeneration procedure. This final effluent is delivered to the dilute chromate solution storage tank.

The liquid from the dilute chromate solution storage tank is returned to the resin for removal of the chromate anions. This step may be carried out either as a separate step or during the normal service cycle by mixing this liquid with the effluent from the plating bath rinse tank.

If only an anion-exchange resin column is employed for purification of the rinse bath effluent, this effluent will have a tendency to increase in pH. Accordingly, it is preferably to also employ a cation-exchange resin column to remove cations from the rinse effluent and to replace them with hydrogen ions. The cation-exchange resin column does not present a serious problem of the delivery of chromate ions to the environment during regeneration. That is, the cation present in the plating solution will ordinarily be a simple alkali metal, which can usually be delivered to the environment without violating local pollution regulations. Thus, a drain may be employed during the cation regeneration procedure.

In accordance with the preferred embodiment of the present invention, the cation-exchange resin is regenerated by first backwashing the resin with water from the aforementioned reservoir, by delivering a solution of acid from a cation regenerant tank to the resin, and by rinsing the resin with water from the reservoir.

The effluent from the backwashing of the resin will be a dilute chromate solution, particularly when the cation-exchange resin is upstream of the anion-exchange resin, as is ordinarily the case. This dilute chromate solution is delivered to the aforementioned dilute chromate solution tank. As regenerant is delivered to the resin, the regenerant will initially displace the backwash water, and this displaced water is also delivered to the dilute chromate solution storage tank.

As the regeneration progresses, the effluent from the cation-exchange resin column will be a solution of whatever cation has been employed during the plating process, usually an alkali metal cation such as sodium or potassium, together with other cations which may be present in small quantities such as iron and tin. This solution of alkali metal cations may simply be drained. As the regeneration progresses further, the effluent will become a more concentrated solution of regenerant acid, and this solution may be delivered to the cation regenerant tank for use during the next regeneration procedure. During the final rinse, the effluent from the cation-exchange column will again become a dilute solution of acid, which may also ordinarily be delivered to the environment without any harmful effects. Preferably, the final portion of the effluent formed during this rinse is delivered to the dilute chromate tank in order to conserve liquid in the system.

In making up the regenerant solutions for both the cation and anion-exchange resin columns, water from the reservoir may be employed as a diluent.

The present invention also provides apparatus for carrying out the aforementioned method, which generally comprises rinse means, such as a rinse tank or the like, for rinsing objects having a source of chromium-containing anions thereon. Rinse water delivery means are provided communicating with the rinse means. The apparatus has an anion-exchange resin column together with means for delivering rinse water from the rinse means to the anion-exchange resin column. A liquid reservoir is provided, and there are means for delivering liquid from the anion-exchange resin column to the liquid reservoir. Finally, means are provided for delivering liquid from the reservoir back to the rinse water delivery means.

To provide for the regeneration procedure, the apparatus of the invention includes means for delivering liquiid from the reservoir to the anion-exchange resin column in order that the resin may be backwashed and rinsed. A dilute anion regenerant tank is provided, together with means for delivering regenerant from the dilute anion regenerant tank to the anion-exchange resin column. A concentrated anion regenerant tank is also provided, together with means for delivering regenerant from the latter tank to the anion-exchange resin column. A dilute chromate solution tank is provided, together with means for delivering liquid from the anion-exchange resin column to this tank. Means are also provided for delivering liquid from this dilute chromate solution tank back to the anion-exchange resin column so that chromate ions may be removed from this liquid. A concentrated chromate storage tank is also provided. together with means for delivering liquiid from the anion-exchange resin column to the concentrated chromate storage tank. Finally, means are provided for delivering liquid from the anion-exchange resin column to both the concentrated and dilute anion regenerant tanks, so that this effluent may be employed in later regeneration procedures. In a preferred embodiment of the present invention, in order to make up regenerant solutions, means are provided for delivering liquid from the reservoir to the concentrated anion regenerant tank.

In the preferred embodiment, the apparatus of the present invention also includes a cation-exchange resin column and means for delivering rinse water from the rinse tank to the cation-exchange resin column. In connection with the regeneration of the cation-exchange resin, a cation regenerant tank is provided, together with means for delivering liquid from the liquid reservoir to the cation regenerant tank for the makeup of regenerant solution. Means are also provided for delivering liquid from the cation-exchangee resin coluumn to the dilute chromate solution tank so that no chromate ions are delivered to the environment during the initial backwash or regeneration procedures. Finally, means are provided for delivering liquid from the cation-exchange resin column to the cation regenerant tank so that partially exhausted regenerant may be reused.

Figure 2:
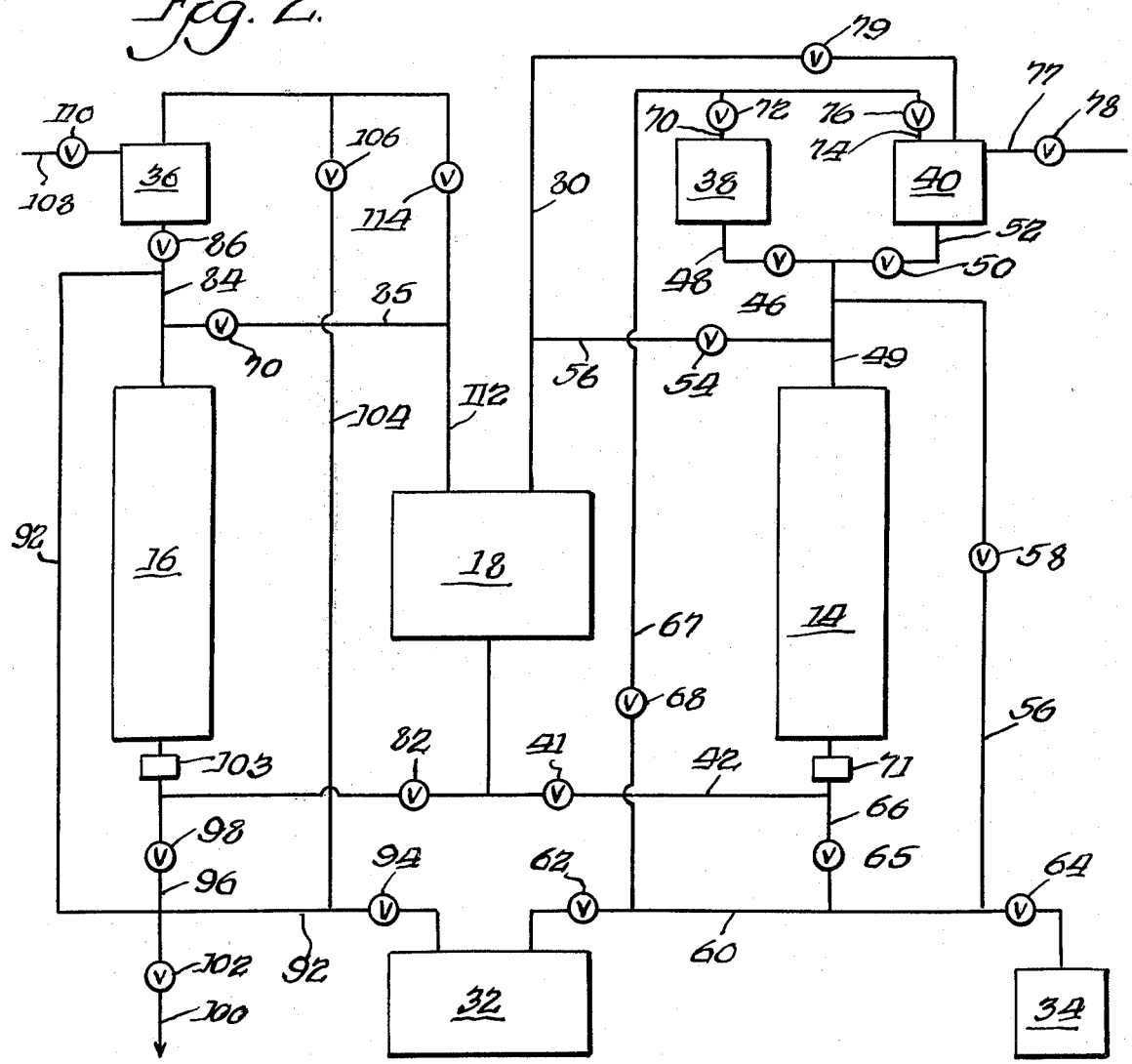

The invention will be best understood by reference to the following more detailed description, taken in conjunction with the drawings, in which:

FIG. 1 is a diagrammatic view of a rinsing apparatus embodying the present invention; and FIG. 2 is a diagrammatic view of a regeneration system embodying the present invention for use in connection with the apparatus shown in FIG. 1.

Referring to FIG. 1, an apparatus for carrying out the present invention comprises a rinse tank 10 having a pair of rinse spray heads 12 above the tank 10. Of course, it will be understood, that the particular rinsing apparatus shown is merely exemplary, and that the present invention is adapted for use with any type of rinsing apparatus. For example, the spray head 12 might not be needed if the rinsing is performed by immersion. Furthermore, other rinse means, such as a simple portable spray head, could be employed. Finally, if the rinsing is accomplished by spraying, it might not be necessary to have a tank 10, but a simple sink or trough with a drain could be employed to collect the spent rinse water.

The apparatus also includes an anion-exchange resin column 14, a cation-exchange resin column 16, and a liquid reservoir 18. According to the usual arrangment, as shown in FIG. 1, the cation-exchange resin column 16 is upstream of the anion exchange resin column 14. The rinse tank 10 communicates with cation-exchange resin column by means of a pipe 20. In the preferred embodiment shown, this pipe 20 has a filter 22 and a heat exchanger 24 thereon. The filter 22 removes any particulate material that may have been collected during the rinsing process, to prevent resin fouling, and the heat exchanger 24 is employed to cool the liquid from the rinse tank 10, as excessively warm liquid can damage the ion-exchange resins. of coursee, a heat exchanger 24 is not needed if the solution from the rinse tank is not warm enough to cause any damage to the resins.

As shown in FIG. 1, the ion-exchange resin columns 14, 16 are connected together by a pipe 26. Although only one anion-exchange resin column 14 and one cation-exchange resin column 16 is shown in the drawings, it will be understood by those skilled in the art that multiple columns are ordinarily used. These columns may either alternate between anion and cation-exchange columns, or all of the columns of each type can be placed together. Thus, in a four-column system, the columns could be arranged in the sequence cation-anion-cation-anion or in the sequence cation-cation-anion-anion. When such multiple columns are employed, any necessity for shutting the system down during regeneration can be eliminated.

After liquid has passed through the cation and anion-exchange columns 16, 14, respectively, it is delivered through a pipe 28 to the reservoir 18. From the reservoir 18, the purified water is delivered back to the spray heads 12 through a rinse water delivery pipe 30.

FIG. 2 shows a regeneration system in accordance with the present invention for regenerating the resins in the anion and cation-exchange resin columns 14, 16, respectively, of FIG. 1. In addition to the anion and cation-exchange resin columns 14, 16 respectively, and the liquid resevoir 18, previously described, FIG. 2 shows a dilute chromate solution tank 32 and a concentrated chromate solution storage tank 34. In addition, the drawing shows a cation regenerant tank 36 communicating with the cation-exchange resin column 16; and a dilute anion regenerant tank 38 and a concentrated anion regenerant tank 40 communicating with the anion-exchange resin column 14.

As will be understood by those skilled in the art, the particular piping system shown in FIG. 2 forms no part of the present invention, and a multitude of variations of this piping system could be employed. In addition, it will be understood that pumps are often required in order to move liquids from one place to another. For simplicity, pumps have not been shown in the drawings, but it is to be understood that pumps are employed wherever required in order to provide adequate liquid pressure. In order to simplify the description of the piping in FIG. 2, the pipes will simply be identified in connection with the description of the operation of the apparatus which follows.

Referring again to FIG. 1, during the normal service cycle, liquid is delivered from the spray heads 12 over an object (not shown) that has been plated, to rinse the plating solution therefrom. This plating solution is delivered to the rinse tank 10. Liquid from the rinse tank 10 passes through the filter 22, where any particulate materials are removed, and then through the heat exchanger 24, where the liquid is cooled so that no damage to the ion exchange resins will result. The liquid, which is ordinarily water, containing cations and chromate ions, is then passed through the cation-exchange column 16, where the cations are removed and exchanged for hydrogen ions. The liquid then is passed through pipe 26 to the anion-exchange resin column 14, where chromate ions and any other anions are removed and exchanged for hydroxide ions. Finally, the liquid passes through pipe 28 to the reservoir 18, where a portion of it is retained. Liquid is delivered from the reservoir 18 through the rinse water delivery pipe 30 back to the spray heads 12 for use in rinsing plated objects as above described.

Periodically, it becomes necessary to regenerate the anion and cation-exchange resins, while avoiding the delivery of chromate ions to the environment. Accordingly, the delivery of liquid from the rinse tank 10 to the ion-exhange columns 14, 16, is halted, and the regeneration operation is begun.

For the purpose of simplicity, the regeneration operation will be described first in terms of the liquids that are delivered to the resin columns 14, 16, and then in terms of the handling of the effluents. The reason for this method of description is that the character of the effluent is not directly related to the character of the influent at any particular time, since the influent is being delivered to the opposite end of the column and is being affected as it passes through the column.

To initiate the regeneration of the anion exchange resin column 14, valve 41 on pipe 42 is opened, permitting backwash water to flow upwardly through the anion-exchange resin column 14. A pump (not shown) will ordinarily be employed during this step. After the backwashing has been completed, a dilute anion regenerant, such as a dilute solution of sodium hydroxide, is delivered to the column from the dilute anion regenerant tank 38 by opening valve 46 on pipe 48, providing communication with an upper portion of the column 14 through pipes 48 and 49. after the desired amount of dilute regenerant has been delivered to the column 14, valve 46 is closed, and valve 50 on pipe 52 is opened, providing communication between the concentrated anion regenerant tank 40 on the column 14. Thus, concentrated regenerant is now delivered in a downflow direction through the column 14. After the delivery of concentrated regenerant to the column 14 has been completed, the valve 50 is closed, and the resin is rinsed by delivering water from the reservoir 18 through the column 14 in a downflow direction. This step is accomplished by opening valve 54 on pipe 56, providing communication between the liquid reservoir 18 and an upper portion of the anion-exchange resin column 14. After the conclusion of this rinsing step, valve 54 is closed and the column 14 may be returned to service.

The initial portion of the effluent from the anion-exchange resin column 14 will simply be a dilute solution of chromate ions which is rinsed from the resin during the initial backwashing step. In fact, if the resin is not highly exhausted, this effluent may simply be water, as any chromate ions will be absorbed by the resin. In any event, this initial effluent is delivered to the dilute chromate solution storage tank 32 by opening valves 58 and 62 on pipes 56 and 60 at the end of the backwashing step, valve 58 is closed, and valve 65 on pipe 66 is opened.

As the dilute regenerant from the dilute anion regenerant tank 38 is delivered to the resin in the column 14, there will initially be a displacement of the backwash water in the column 14. However, this regenerant will replace chromate ions in the resin with hydroxide ions, so that the effluent will soon become rich in chromate ions. This change may be detected on a conductivity basis, or, preferably, on a time basis. In any event, when the chromate ion concentration of the effluent begins to increase, valve 62 is closed, and another valve 64 on pipe 60 is opened, permitting the effluent to flow to the concentrated chromate solution storage tank 34. This chromate solution is retained for later recovery of chromate ions.

As the regeneration progresses, the hydroxide ion concentration in the effluent will increase, while the chromate ion concentration will decrease. When this change occurs, valve 64 is closed, and valve 68 on pipe 67 is opened. At the same time, a valve 72 on pipe 70 is opened, permitting flow through pipes 66, 60, 67, and 70 to the dilute anion regenerant tank 38. The diversion of delivery of effluent from the concentrated chromate solution storage tank 34 to the dilute anion regenerant tank 38 may be made on a time, pH or conductivity basis. A pH basis is normally the most satisfactory, as there will be a sharp increase in hydroxide ion concentration at the point at which it is desired to make this change. Accordingly, a suitable pH sensor 71 on pipe 56 may be employed to sense this point. It is also possible to sense this point by simply observing the color of the liquid. That is, the formation of orange dichromate ions ($Cr_2O_7$) will be favored by a low pH, while the formation of yellow chromate ($C_rO_4$) will be favored by a higher pH. However, when automatic means are used, it is simpler to sense the pH change.

As the regeneration progresses, the effluent from the column 14 will become a more concentrated solution of hydroxide ions, as reflected by an even higher pH. Accordingly, at some predetermined high pH level, as sensed by the pH sensor 71, valve 72 will be closed, and valve 76 on pipe 74 will be opened, permitting the flow of effluent to the concentrated anion regenerant storage tank 40.

Finally, as the rinsing of the resin progresses, the pH of the effluent will fall, indicating that the effluent is primarily water, or perhaps a highly dilute solution of regenerant, possibly containing some chromate ions. This effluent is again delivered to the dilute chromate solution tank 32 by closing valves 68 and 76 and opening valve 62. Again, the point at which this operation is performed can be based on the conductivity or pH of the effluent. After the regeneration has been completed, valve 65 is closed, and the anion-exchange resin column 14 is returned to service. During the service cycle, or as a separate step, the contents of the dilute chromate solution tank 32 are delivered to the column 14 by opening valve 58 on pipe 56, or by simply metering the contents of this tank into the effluent from the rinse tank 10 by suitable piping means not shown in the drawings.

In preparation for the next regeneration run, fresh regenerant, such as sodium hydroxide, is delivered to the concentrated anion regenerant tank 40 through regenerant inlet pipe 77 having a valve 78. This regenerant is diluted to the desired concentration with water from the liquid reservoir 18, which is delivered through pipe 80 by opening valve 79. Alternatively, the contents of the concentrated regenerant tank 40 by may be mixed in line with fresh regenerant as it is delivered to the anion-exchange column 14.

The various points for initiating and/or terminating the effluent delivery to the variuos effluent recovery tanks 32, 34, 38, 40 is somewhat arbitrary, and these points can be determined by those skilled in the art depending upon the desired chromate ion concentrations in tanks 32 and 34 and upon the desired hydroxide ion concentrations in tanks 38 and 40.

As previously stated, the initial delivery of liquid to the dilute chromate solution tank 32 is preferably terminated on a time basis, i.e., on the basis of the time that it takes to displace the backwash water in the column 14. The delivery of liquid to the concentrated chromate solution storage tank 34 is preferably terminated on the basis of pH. For example, this delivery could be terminated when the pH rises above, say 8. Similarly, the delivery of effluent to the dilute regenerant tank 38 is terminated on a pH basis, say, pH 9. However, as those skilled in the art will recognize, these specific pH values are somewhat arbitrary.

The regeneration of the resin in the cation-exchange resin column in accordance with the present invention is much simpler, in that this regeneration does not involve the avoidance of delivering harmful ions to the environment, except during the initial backwash and rinse steps.

In regenerating the cation-exchange resin, the column 16 is initially backwashed with water from the reservoir 18 by opening valve 82 on pipe 84. Again, a suitable pump (not shown) may be employed. After the backwashing has been completed, which is determined on a time basis, valve 82 is closed. Valve 86 on pipe 84 is then opened, permitting the delivery of regenerant, such as sulfuric or hydrochloric acid, from the cation regenerant tank 36. After the regeneration has been completed, valve 86 is closed, and valve 90 on pipe 88 is opened, permitting the delivery of water from the reservoir 18 to the cation-exchange resin column 16 in a downflow direction to rinse the resin.

The effluent from the backwashing of the resin will be a dilute solution containing chromate ions. This solution will ordinarily be more concentrated in chromate ions than that obtained during the initial backwashing of the anion-exchange resin because the liquid entrained in the cation-exchange resin column 16 has not passed through an anion-exchange resin, and therefore none of the chromate ions have bee removed. This initial dilute solution of chromate solution tank 32 by opening valve 94 in pipe 92.

After the backwashing step is terminated, valve 98 on pipe 96 is opened, permitting the delivery of water to the dilute chromate solution storage tank 32 during the initial portion of the regenerant delivery.

As the backwash water is displaced during the delivery of regenerant, the effluent will become increasingly concentrated in cations, generally an alkali metal cation such as sodium, which are displaced from the cation-exchange resin by the acid regenerant. This point is preferably determined on a time basis, but could also be sensed on the basis of increasing conductivity. There will be no significant amount of chromate ions in the effluent at this time. Accordingly, valve 94 is closed, and valve 102 on drain pipe 100 is opened, and the effluent solution of cations is simply drained.

As the regeneration becomes complete, the effluent pH, as sensed by the pH sensor 103, will decrease, reflecting an increasing concentration of acid. At a given pH level, say pH 4, the drain valve 102 is closed, and valve 106 on pipe 104 is opened, so that the effluent acid is returned to the cation regenerant tank 36 for use in the next regeneration cycle.

Finally, the concentration of acid in the effluent will decrease as the resin is rinsed. This decrease is sensed by an increase in pH at the pH sensor 103. When the concentration decreases to a predetermined level, valve 106 is closed, and the valve 102 is again opened, permitting the delivery of this dilute acid solution to the drain. As the rinsing continues, the concentration of acid in the effluent will fall even further, as indicated by a further increase in effluent pH at the pH 103. In this preferred embodiment of the invention, the drain valve 102 will be closed, and the final portion of the rinse effluent will be delivered to the dilute chromate solution tank 32. Although this effluent will not contain any chromate ions, it is nevertheless preferred to deliver it to the dilute chromate solution tank 32 in order to conserve liquid in the system.

Fresh acid regenerant is delivered to the cation regenerant tank 36 through a pipe 108 having a valve 110. This acid is diluted to the desired concentration by opening valve 114 on pipe 112, permitting the delivery of water from the reservoir 18.

After the regeneration of the resin is complete, the cation-exchange resin column 16 is returned to service.

As can be seen from the foregoing description, the present invention used demineralized water from the reservoir 18 for a number of purposes, including the rinsing of plated items at the rinse tank 10, the backwashing of the ion-exchange resin columns 14, 16, and the preparation of regenerant solutions. Because some liquid is drained at the drain pipe 100, it may be necessary to add makeup water to the system at times. This can be accomplished by simply delivering tap water, or preferably demineralized water, into the ion-exchange system during the service cycle, as will be obvious to those skilled in the art.

Although the regeneration and rinsing of the ion-exchange resins has been described as taking place in a downflow direction, upflow regeneration and/or rinsing could also be employed within the scope of the present invention. However, the downflow regeneration and rinsing described are the preferred procedures.

Suitable cation and anion-exchange resins for use in the method and apparatus of the present invention are well known to those skilled in the art. Generally, those of the strong-acid or medium-acid and strong-base or medium-base type may be employed. Suitable anion-exchange resins include those of the phenol-formaldehyde type, the divinylbenzene-styrene copolymer type, the acrylic type, and the epoxy type. Suitable cation exchange resins include those of the divinylbenzene-styrene copolymer type, the acrylic type, the sulfonated coal type, and the phenolic type. The cation-exchange resins are normally used in the hydrogen form, while the anion exchange resins are normally used in the hydroxide form. A particularly suitable anion-exchange resin for use in the present invention is marketed by the Bayer Co. of West Germany under the trade name "Lewatit MP 64." This resin is described as a "medium-basic anion exchange resin with a macroporous structure." Particularly suitable cation exchange resins are sold by the Bayer Co. under the trade names "Lewatit SP 120" and "Lewatit SP 112". These resins are described by the manufacturer as "macroporous polystyrene-based strongly acidic cation exchange resins."

As previously stated, chromate will periodically be recovered from the concentrated chromate solution storage tank 34. If the plating solution is chromic acid, the recovery could be accomplished, for example, by passing the liquid in tank 34 through a cation-exchange resin in the hydrogen form. Since the liquid in tank 34 will ordinarily be an alkali metal chromate, chromic acid will be formed. Other methods for accomplishing chromate recovery are known to those skilled in the art, and the particular method used has no relation to the present invention.

As will be clear from the foregoing description, the method and apparatus of the present invention have many significant advantages in addition the prevention of chromate being delivered to the environment. For example, the invention permits the recovery of chromate for re-use, in the chrome plating tank or in other processes requiring chromate. Contamination of this recovered chromate is prevented by the use of recycled demineralized water in the system, as this recycled water has a consistent low concentration of dissolved materials and suspended solids. This high-quality demineralized water is also used in the rinse step, producing highly efficient rinsing with improved quality of finish on the plated material, leaving a minimum amount of chromate residue. Of course, this same high-quality water is employed for resin backwashing and rinsing and for the make-up of regenerant solutions. Finally, regenerants are partially reused, resulting in additional monetary savings.

Obviously, many modifications and variations of the invention as hereinbefore set forth will occur to those skilled in the art, and it is intended to cover in the appended claims all such modifications and variations as fall within the true spirit and scope of the invention.

I claim:

1. A method for rinsing an object having a source of chromium-containing anions thereon while preventing the delivery of chromium-containing anions to the environment comprising:
   passing rinse water over said object, whereby to form a solution of chromium-containing anions;
   delivery said solution of chromium-containing anions to an anion-exchange resin, whereby to remove said chromium-containing anions and to form purified water;
   delivering said purified water to a reservoir;
   passing water from said reservoir over said object;
   periodically regenerating said anion-exchange resin by sequentially backwashing said resin with water from said reservoir; delivering a dilute solution of alkali metal hydroxide from a dilute anion regenerant tank to said resin; delivering a more concentrated solution of alkali metal hydroxide from a concentrated anion regenerant tank to said resin; and rinsing said resin with water from said reservoir;
   delivering the effluent from said regenerating of said anion-exchange resin sequentially to a dilute chromate solution storage tank, to a concentrated chromate solution tank, to said dilute anion regenerant tank, to said concentrated anion regenerant tank, and to said dilute chromate solution tank; and
   delivering said effluent from said dilute chromate solution tank to said resin.

2. The method as defined in claim 1 further comprising the step of recovering chromate ions from said effluent in said concentrated chromate solution storage tank.

3. The method as defined in claim 1 further comprising the step of passing said solution of chromium-containing anions to a cation-exchange resin, whereby to remove cations from said solution.

4. The method as defined in claim 3 further comprising a step of periodically regenerating said cation-exchange resin by sequentially rinsing said resin with water from said reservoir, delivering a solution of acid from a cation regenerant tank to said resin, and rinsing said resin with water from said reservoir; and delivering the effluent from said regenerating of said cation-exchange resin sequentially to said dilute chromate solution tank, to drain, and to said cation regenerant tank.

5. The method as defined in claim 4 further comprising delivering the final portion of said effluent from said regenerating of said cation-exchange resin to said dilute chromate solution storage tank.

6. Improved apparatus for rinsing an object having chromium-containing ion thereon comprising:

rinse means for risning objects having a source of chromium-containing anions thereon;
rinse water delivery means communicating with said rinse means;
an anion-exchange resin column;
means for delivering rinse water from said rinse means to said anion-exchange resin column;
a liquid reservoir;
means for delivering liquid from said anion-exchange resin column to said liquid reservoir;
means for delivering liquid from said reservoir to said rinse water delivery means;
means for delivering liquid from said reservoir to said anion-exchange resin column;
a dilute anion regenerant tank;
means for delivering regenerant from said dilute anion regenerant tank to said anion exchange resin column;
a concentrated anion regenerant tank;
means for delivering regenerant from said concentrated anion regenerant tank to said anion-exchange resin column;
a dilute chromate solution tank;
means for delivering liquid from said anion-exchange resin column to said dilute chromate solution tank;
means for delivering liquid from said dilute chromate solution tank to said anion-exchange resin column;
a concentrated chromate solution storage tank;
means for delivering liquid from said anion exchange resin column to said concentrated chromate storage tank; and
means for delivering liquid from said anion exchange resin column to said concentrated and dilute anion regenerant tanks.

7. The apparatus as defined in claim 6 further comprising means for delivering liquid from said reservoir to said concentrated anion regenerant tank.

8. The apparatus as defined in claim 7 further comprising a cation-exchange resin column; and means for delivering rinse water from said rinse tank to said cation-exchange resin column.

9. The apparatus as defined in claim 8 further comprising:

a cation regenerant tank;
means for delivering liquid from said liquid reservoir to said cation regenerant tank;
means for delivering liquid from said cation-exchange resin column to said dilute chromate solution tank; and
means for delivering liquid from said cation-exchange resin column to said cation regenerant tank.

10. The apparatus as defined in claim 9 further comprising a heat exchanger and means for passing liquid from said rinse tank through said heat exchanger before said liquid reaches said ion-exchange resin columns.

11. The apparatus as defined in claim 10 further comprising a filter and means for passing liquid from said rinse tank through said filter before said liquid reaches said ion-exchange resin columns.

* * * * *

UNITED STATES PATENT AND TRADEMARK OFFICE
CERTIFICATE OF CORRECTION

PATENT NO. : 3,989,624

DATED : November 2, 1976

INVENTOR(S) : William A. Wachsmuth

It is certified that error appears in the above-identified patent and that said Letters Patent are hereby corrected as shown below:

Column 1, line 32, chromium-containing anions should read --"chromium-containing anions"--

Column 1, line 41, chromate should read --"chromate"--

Column 1, line 41, any should read --any--

Column 1, line 43, chromate should read --"chromate"--

Column 1, line 44, chromium-containing anion should read --"chromium-containing anion"--

Column 3, line 23, iis should read --is--

Column 3, line 62, liquiid should read --liquid--

Column 4, line 29, cation-exchangee should read --cation-exchange--

Column 4, line 30, coluumn should read --column--

Column 4, line 64, after with insert --the--

Column 5, line 4, coursee should read --course--

Column 7, line 59, after 40 delete "by"

Column 8, line 68, after the insert --drain--

Column 9, line 4, after $p^H$ second occurrence, insert --sensor--

Column 9, line 20, used should be --uses--

UNITED STATES PATENT AND TRADEMARK OFFICE
CERTIFICATE OF CORRECTION

PATENT NO. : 3,989,624
DATED : November 2, 1976
INVENTOR(S) : William A. Wachsmuth It is certified that error appears in the above—identified patent and that said Letters Patent are hereby corrected as shown below:

Column 9, line 23, after 14, 16, insert --the rinsing of the columns 14, 16,--

Column 10, line 35, delivery should be --delivering--

Column 11, line 14, risning should be --rinsing--

Signed and Sealed this

Fourth Day of January 1977

[SEAL]

Attest:

RUTH C. MASON
Attesting Officer

C. MARSHALL DANN
Commissioner of Patents and Trademarks